(12) United States Patent
Duncan et al.

(10) Patent No.: US 9,286,794 B2
(45) Date of Patent: Mar. 15, 2016

(54) PEDESTRIAN WARNING SYSTEM

(71) Applicant: Elwha LLC, Bellevue, WA (US)

(72) Inventors: William D. Duncan, Kirkland, WA (US); Roderick A. Hyde, Redmond, WA (US); Elizabeth E. Nugent, Bellevue, WA (US); Robert C. Petroski, Seattle, WA (US); Yaroslav A. Urzhumov, Bellevue, WA (US)

(73) Assignee: Elwha LLC, Bellevue, WA (US)

( * ) Notice: Subject to any disclaimer, the term of this patent is extended or adjusted under 35 U.S.C. 154(b) by 47 days.

(21) Appl. No.: 14/132,795

(22) Filed: Dec. 18, 2013

(65) Prior Publication Data

US 2015/0109149 A1   Apr. 23, 2015

Related U.S. Application Data

(63) Continuation-in-part of application No. 14/057,732, filed on Oct. 18, 2013.

(51) Int. Cl.
*G08G 1/095* (2006.01)
*G08G 1/005* (2006.01)
*G06K 9/00* (2006.01)
*B60Q 9/00* (2006.01)

(52) U.S. Cl.
CPC ............ *G08G 1/005* (2013.01); *G06K 9/00362* (2013.01); *B60Q 9/008* (2013.01)

(58) Field of Classification Search
CPC ....................................................... B60Q 9/008
USPC .................. 340/901, 903, 438, 436, 435, 944
See application file for complete search history.

(56) References Cited

U.S. PATENT DOCUMENTS

| | | | |
|---|---|---|---|
| 4,725,840 A | 2/1988 | Orazietti | |
| 5,111,210 A | 5/1992 | Morse | |
| 5,434,668 A | 7/1995 | Wootton et al. | |
| 5,654,705 A * | 8/1997 | Houten et al. | ................ 340/944 |
| 6,731,202 B1 * | 5/2004 | Klaus | .......................... 340/425.5 |
| 7,596,242 B2 | 9/2009 | Breed et al. | |
| 8,125,348 B2 | 2/2012 | Cemper | |
| 8,157,047 B2 | 4/2012 | Breed | |
| 8,253,589 B2 | 8/2012 | Grimm et al. | |
| 2004/0145496 A1 | 7/2004 | Ellis | |
| 2004/0217869 A1 | 11/2004 | Bouchard et al. | |
| 2005/0062640 A1 | 3/2005 | Edwards et al. | |
| 2005/0200462 A1 | 9/2005 | Maekawa et al. | |
| 2007/0268129 A1 | 11/2007 | Bouchard et al. | |
| 2008/0042894 A1 | 2/2008 | Kikuchi | |
| 2010/0123547 A1 | 5/2010 | Stevenson et al. | |
| 2010/0328049 A1 | 12/2010 | Frysz et al. | |
| 2011/0090093 A1 | 4/2011 | Grimm et al. | |
| 2011/0128625 A1 | 6/2011 | Larsen et al. | |
| 2011/0133915 A1* | 6/2011 | Ito | ................................. 340/435 |
| 2011/0133954 A1 | 6/2011 | Ooshima et al. | |
| 2012/0001735 A1 | 1/2012 | Fink et al. | |
| 2012/0008129 A1 | 1/2012 | Lu et al. | |

(Continued)

OTHER PUBLICATIONS

PCT International Search Report; International App. No. PCT/US2014/047543; Nov. 12, 2014; pp. 1-3.

(Continued)

*Primary Examiner* — Brent Swarthout

(57) ABSTRACT

A pedestrian warning system monitors an attention level of a pedestrian and alerts the pedestrian of traffic areas or detected vehicles.

56 Claims, 2 Drawing Sheets

(56) References Cited

U.S. PATENT DOCUMENTS

| | | |
|---|---|---|
| 2012/0032806 A1 | 2/2012 | Lee |
| 2012/0095646 A1 | 4/2012 | Ghazarian |
| 2012/0194399 A1 | 8/2012 | Bily et al. |
| 2012/0203572 A1 | 8/2012 | Christensen |
| 2012/0224076 A1 | 9/2012 | Niedermeyer et al. |
| 2012/0248198 A1 | 10/2012 | Baba et al. |
| 2012/0256727 A1 | 10/2012 | Moore, Jr. |
| 2013/0015963 A1 | 1/2013 | Stegmaier et al. |
| 2013/0015977 A1 | 1/2013 | Scott |
| 2013/0060400 A1 | 3/2013 | Hahne |
| 2013/0094712 A1 | 4/2013 | Said |
| 2013/0103519 A1 | 4/2013 | Kountotsis et al. |
| 2013/0127638 A1* | 5/2013 | Harrison ................ 340/903 |
| 2013/0128046 A1* | 5/2013 | Gindin ................ 348/148 |
| 2013/0141576 A1 | 6/2013 | Lord et al. |
| 2013/0176125 A1 | 7/2013 | Beck et al. |
| 2013/0184980 A1 | 7/2013 | Ichikawa et al. |
| 2013/0321177 A1 | 12/2013 | Kirk |
| 2013/0344859 A1 | 12/2013 | Abramson et al. |
| 2014/0009310 A1 | 1/2014 | Nagy |
| 2014/0035740 A1 | 2/2014 | Lettström et al. |
| 2014/0198216 A1 | 7/2014 | Zhai et al. |
| 2014/0297058 A1* | 10/2014 | Barker et al. ................ 701/1 |
| 2014/0300473 A1 | 10/2014 | Vatn et al. |
| 2014/0354684 A1* | 12/2014 | Beckwith et al. ............. 345/633 |
| 2015/0035685 A1* | 2/2015 | Strickland et al. ............ 340/901 |

OTHER PUBLICATIONS

Bird, Dudley; "Design and Manufacture of a Low-Profile Radar Retro-Reflector"; NATO OTAN; Apr. 19-20, 2004; pp. 1-39; published in RTO-MP-SCI-145.

Jin, Xian; "Integrated Optical Devices for Free-Space Optical Communications"; 2006 and Dec. 2009; pp. 1-116; Xian Jin.

Thorton, J. and Edwards, D.J.; "Modulating retro-reflector as a passive radar transponder"; Electronics Letters; Sep. 17, 1998; pp. 1880-1881; vol. 34, No. 19; IEE.

* cited by examiner

PEDESTRIAN WARNING SYSTEM

If an Application Data Sheet (ADS) has been filed on the filing date of this application, it is incorporated by reference herein. Any applications claimed on the ADS for priority under 35 U.S.C. §§119, 120, 121, or 365(c), and any and all parent, grandparent, great-grandparent, etc. applications of such applications, are also incorporated by reference, including any priority claims made in those applications and any material incorporated by reference, to the extent such subject matter is not inconsistent herewith.

CROSS-REFERENCE TO RELATED APPLICATIONS

The present application claims the benefit of the earliest available effective filing date(s) from the following listed application(s) (the "Priority Applications"), if any, listed below (e.g., claims earliest available priority dates for other than provisional patent applications or claims benefits under 35 USC §119(e) for provisional patent applications, for any and all parent, grandparent, great-grandparent, etc. applications of the Priority Application(s)).

PRIORITY APPLICATIONS

The present application constitutes a continuation-in-part of U.S. patent application Ser. No. 14/057,732, entitled PEDESTRIAN WARNING SYSTEM, naming Jesse R. Cheatham, III, William D. Duncan, Roderick A. Hyde, Nathan P. Myhrvold, and Lowell L. Wood, Jr. as inventors, filed 18 Oct. 2013.

If the listings of applications provided above are inconsistent with the listings provided via an ADS, it is the intent of the Applicant to claim priority to each application that appears in the Domestic Benefit/National Stage Information section of the ADS and to each application that appears in the Priority Applications section of this application.

All subject matter of the Priority Applications and of any and all applications related to the Priority Applications by priority claims (directly or indirectly), including any priority claims made and subject matter incorporated by reference therein as of the filing date of the instant application, is incorporated herein by reference to the extent such subject matter is not inconsistent herewith.

SUMMARY

In one aspect, a pedestrian warning device includes a computing device (e.g., a mobile telephone or wearable device) configured to be worn or carried by a pedestrian and to monitor an attention level of the pedestrian, and an alarm (e.g., an audible, visible, or haptic alarm) configured to warn the pedestrian of a vehicle detected by the computing device. The pedestrian device may include a camera or a microphone configured to detect the vehicle. The alarm may be configured to warn the pedestrian only if a predicted collision probability is above a threshold, or the attention level of the pedestrian is below a threshold. The alarm may be in response to the attention level of the pedestrian, or in a mode selected in response to the attention level of the pedestrian. The alarm may be in a mode selected in response to an activity type of the pedestrian (e.g., typing, talking, taking a picture, taking a video, having a video conference, playing a timed game, playing an untimed game, reading, watching a display, or using a display-based application). The alarm may be configured to warn the pedestrian in response to attention history, eye position, eye position history, head orientation, head orientation history, position or motion of the pedestrian, position or motion of the computing device, or alarm response history of the pedestrian. The pedestrian warning device may further include a GPS configured to identify a location of the pedestrian (e.g., to determine if the pedestrian is crossing a street at an intersection), and may monitor the gaze or head position of the pedestrian and warn the pedestrian if he attempts to cross without looking in a direction of oncoming traffic. The pedestrian warning device may further include a sensor configured to monitor a traffic signal, in which case the alarm may be configured to alert the pedestrian if he attempts to cross the street in contravention of the traffic signal. The pedestrian warning device may further include a memory, which may be configured to store a record of the pedestrian's actions, a record of vehicle detections, or a record of alarms issued.

In another aspect, a method of warning a pedestrian of a vehicle includes monitoring an attention level of the pedestrian by monitoring an electronic device carried or worn by the pedestrian (e.g., a mobile telephone or wearable device), detecting a vehicle (e.g., with a camera or microphone), and, in response to the detected vehicle and the monitored attention level, alerting the pedestrian to the presence of the vehicle (e.g., with a visual, audible, or haptic alarm). Alerting the pedestrian may include alerting the pedestrian in response to an attention level, attention history, eye position, eye position history, head orientation, head orientation history, alarm reponse history, position, or motion of the pedestrian, or in response to a position or motion of the device. Monitoring the attention level may include monitoring a device activity (e.g., typing, talking, taking a picture, taking a video, having a video conference, playing a timed game, playing an untimed game, reading, watching a display, or using a display-based application), in which case an alert mode may be selected in response to the device activity. The method may further include storing data in a memory, such as a record of the pedestrian's actions, a record of vehicle detections, or a record of pedestrian alerts.

In another aspect, a system for monitoring the behavior of a pedestrian includes a computing device configured to be worn or carried by a pedestrian, to monitor an attention level of the pedestrian, and to detect a vehicle (e.g., with a camera or microphone), and a memory configured to store information about the actions of the pedestrian. The system may further include a transmitter configured to transmit information about the actions of the pedestrian to a remote location, or a display configured to display information stored in the memory. The device may be configured to store a record of pedestrian activity (e.g., typing, talking, taking a picture, taking a video, having a video conference, playing a timed game, playing an untimed game, reading, watching a display, or using a display-based application). The system may further include a GPS configured to identify a location of the pedestrian, in which case the memory may be configured to store the identified location. The memory may be configured to store gaze direction, head position, device orientation, or a record of vehicle detections.

In another aspect, a method for monitoring the behavior of a pedestrian includes monitoring an attention level, a position, and a motion of the pedestrian, and alerting the pedestrian (e.g., with a visible, audible, or haptic alarm) if the pedestrian is determined to be in danger from a vehicle in response to the monitored data. Monitoring the position of the pedestrian may include determining the proximity of the pedestrian to a street (e.g., with a GPS, a camera, or a microphone). A GPS may monitor the position or motion of the pedestrian. Monitoring motion may include determining that the pedestrian is moving toward a street. Alerting the pedestrian may be in response to an attention level, attention history, eye position, eye position history, head orientation, head orientation history, device orientation, device orientation history, or alarm response history. Monitoring the attention level may include monitoring a device activity of the pedestrian (e.g., typing, talking, taking a picture, taking a video, having a video conference, playing a timed game, playing an untimed game, reading, watching a display, or using a display-based application), in which case it may further include selecting an alert mode in response to the device activity. The method may further include storing a record of vehicle detections or pedestrian alerts in a memory.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
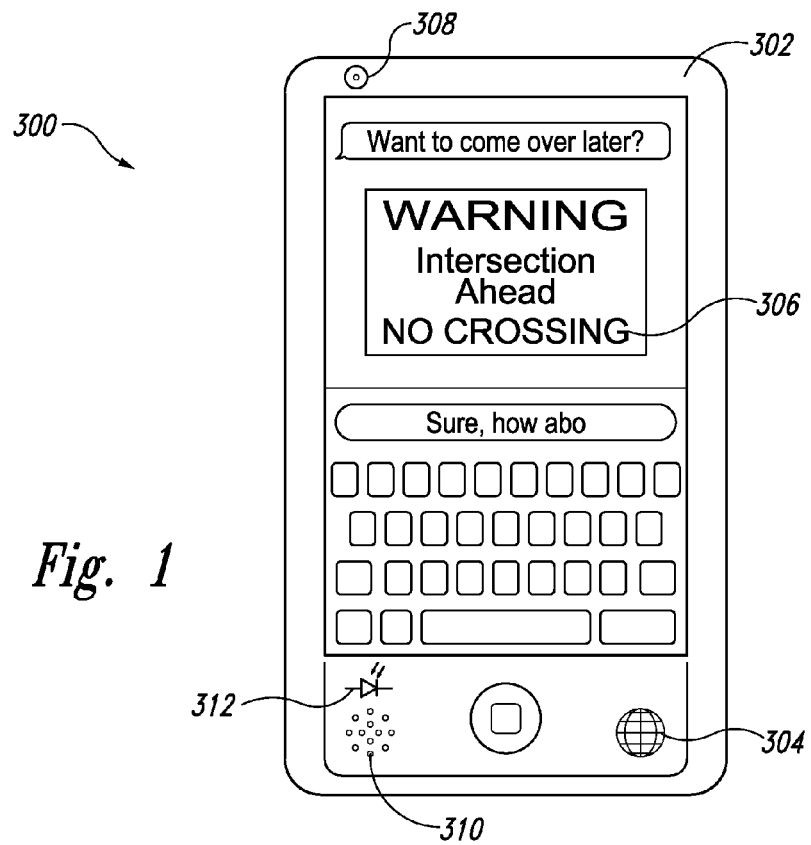
FIG. 1 shows a cellular telephone running an application for warning a pedestrian.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

"Pedestrian," as that term is used herein, includes a person that is not currently in a vehicle, or is using a "pedestrian vehicle" typically permitted on a sidewalk, such as a bicycle, wagon, skateboard, scooter, wheelchair (including motorized wheelchairs), or personal transport such as a SEGWAY™. Pedestrians may include adults or children. "Demographics" of a pedestrian may include age, sex, physical capabilities (or capabilities of a pedestrian vehicle in use), or other relevant information about the pedestrian. "Identifying information" of a pedestrian may include information such as name, address, guardian, next-of-kin, or the like.

"Garment," as that term is used herein, includes clothing, apparel, or jewelry such as but not limited to shirts, coats, pants, shoes, hats, collars, bracelets, earrings, belts, or backpacks, and also objects designed to be carried by pedestrians, such as but not limited to briefcases, purses, suitcases, keyfobs, cellphones, or tablets.

This application makes reference to technologies described more fully in U.S. patent application Ser. No. 13/950,719, filed Jul. 25, 2013, and Ser. No. 14/011,275, filed Aug. 27, 2013, both entitled "Wearable Radar Retroreflectors." Both of these applications are incorporated by reference herein.

Pedestrians must maintain awareness of their surroundings to avoid being struck by cars or other vehicles. This awareness is sometimes compromised by pedestrians' use of electronics. Mobile phones and texting can be particularly absorbing, as can various games available on "smart" phones and other devices. Furthermore, children, pets, and even adults caught by surprise may panic at the sight of an oncoming vehicle and may use counterproductive avoidance strategies like trying to outrun a car. A system that uses ingrained reflexes, especially when issued before the oncoming vehicle is seen (e.g., in a parent's voice), may produce more productive behavior.

FIG. 1 illustrates an implementation of a pedestrian warning system designed to alert a pedestrian who is distracted by texting. Telephone 302 includes a global positioning system (GPS) 304, that monitors the location of the pedestrian relative to the street. (In some embodiments, the phone may also use its camera 308 or its microphone 310 to detect a vehicle, and may optionally modify its warnings in response to such detection.) In the embodiment shown in FIG. 1, while the phone was being used for texting, a warning box 306 shows that the pedestrian is approaching an intersection. The illustrated phone 302 also includes a traffic light sensor 312, and the display indicates the light is red ("NO CROSSING"). (Traffic light sensors are described in U.S. Pat. No. 6,985,073, which is incorporated by reference herein to the extent not inconsistent herewith.) While element 312 is shown in FIG. 1 as the traditional symbol for a photodiode, which may be configured to directly "look at" the traffic signal and respond to its color, it may also be implemented as an antenna or other device configured to receive a broadcast signal from the traffic signal, or a microphone or similar device configured to interpret an audible signal from the traffic signal. The words "NO CROSSING" may change to "GREEN LIGHT" or a pedestrian walking symbol or any other appropriate symbol or message when the pedestrian is permitted to cross. In this or other embodiments, telephone 302 may also (or instead) emit an audible or haptic alarm. In some embodiments, the first alarm may be audible, for example, with warning box 306 appearing over the texter's screen only when it appears that he may be about to step into the intersection. In some embodiments, an audible alarm may be recorded in the voice of the pedestrian's parent or guardian, or another authority figure that the pedestrian is expected to reflexively obey.

Figure 2:
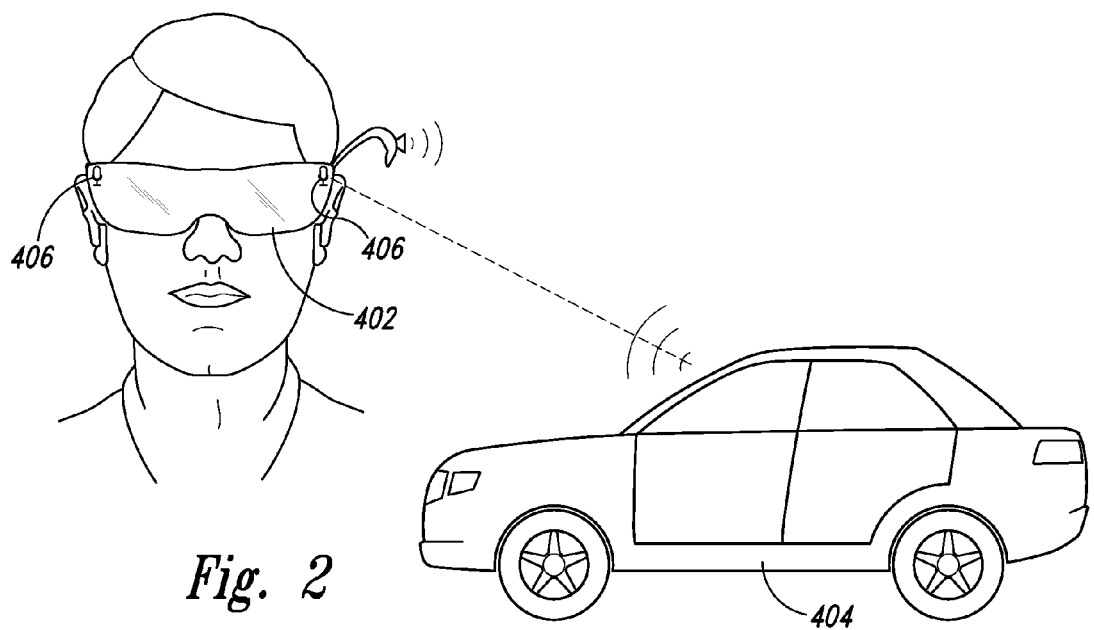
FIG. 2 shows a wearable device running an application that detects a vehicle and warns a pedestrian.

In another embodiment, FIG. 2 shows an a wearable device 402 that is configured to detect a vehicle 404 and to warn the pedestrian of it. In the illustrated embodiment, the vehicle is detected via microphone 406 of device 402, which monitors for a characteristic engine noise. In other embodiments, the device may use a camera to watch for cars or other vehicles. These embodiments are expected to perform better at detecting electric vehicles, which may be relatively silent compared to conventional internal-combustion engines. However, makers of electric vehicles sometimes include audio recordings of engine noise to prevent pedestrians from being taken by surprise. In some embodiments, the device may listen specifically for such recordings. Apps may include sound libraries or other methods of recognizing such sounds, especially if, in the future, recorded or digitally-generated sounds become standard for such cars.

In the illustrated embodiment, microphone 406 is a stereo microphone that allows device 402 to identify the approximate direction of vehicle 404. In some embodiments, a monaural microphone may be used. Even though this does not typically permit the direction of the vehicle to be determined without additional hardware, device 402 is still able to warn the pedestrian of the vehicle. In some embodiments, the device's camera may supplement (e.g., looking for a car once it has been detected by the microphone) or replace the microphone for vehicle detection. The wearable device illustrated in FIG. 2 may also monitor a head position (or eye direction) of the pedestrian as further described below.

In some embodiments, device 402 (or phone 302) may include a memory configured to store information about the actions of the pedestrian. In such embodiments, the device may optionally also warn the pedestrian of approaching vehicles, but the memory may provide a record of the pedestrian's behavior in response to vehicles that may be reviewed by the pedestrian or his parent or guardian. This review may be used to facilitate behavior management systems to improve the safety of the pedestrian in the presence of traffic.

Figure 3:
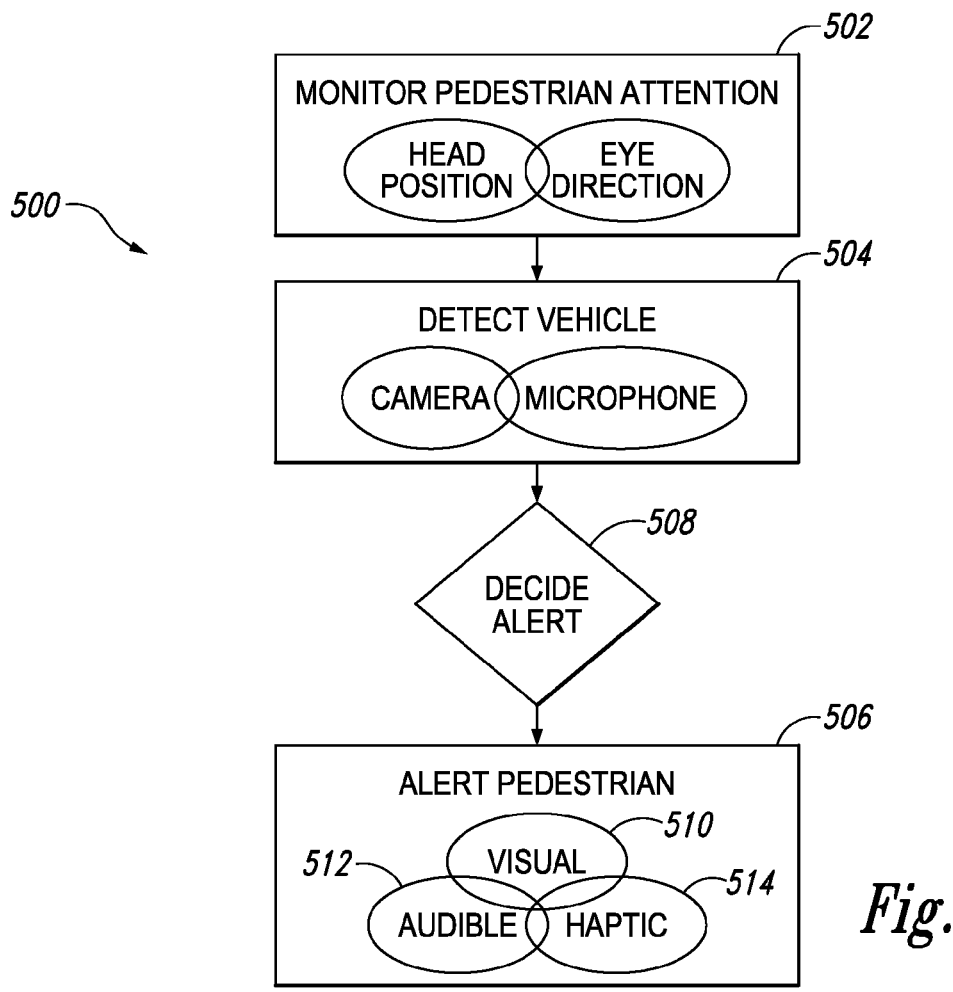
FIG. 3 is a flowchart illustrating the use of the applications shown in FIG. 1 and FIG. 2.

FIG. 3 is a flowchart 500 showing how the pedestrian warning system of FIG. 1 or FIG. 2 may be used. The system continuously (or intermittently) monitors 502 an attention level of a pedestrian, for example by monitoring the activity of the pedestrian on the device or by monitoring his head position or eye position (gaze direction) to determine whether he is looking for traffic. The system also detects 504 a vehicle, for example using a camera, microphone, or both. In some embodiments, the system may proceed directly to alerting the pedestrian, while in others, it first determines 508 whether to alert (or how to alert, as described below). For example, if the device has been monitoring head position, it may decide to alert only if the pedestrian has not turned his head in the direction of the vehicle recently. In response to the detected vehicle and the monitored attention level, the device alerts 506 the pedestrian to the vehicle. The form of the alert may be determined by the attention level or device activity. For example, the device may use a visual alert 510 when the pedestrian is looking at a handheld device (e.g., texting or watching a video), or an audio alert 512 or haptic alert 514 when the pedestrian is not looking at a handheld device (e.g., talking on the phone or wearing the device shown in FIG. 2). Multiple alerts may be given sequentially or simultaneously depending on the response to the first alert. The details of the alarms used and the conditions under which the device will alert the user may be user-defined, either by the pedestrian or by another user (e.g., a parent or guardian).

Figure 4:
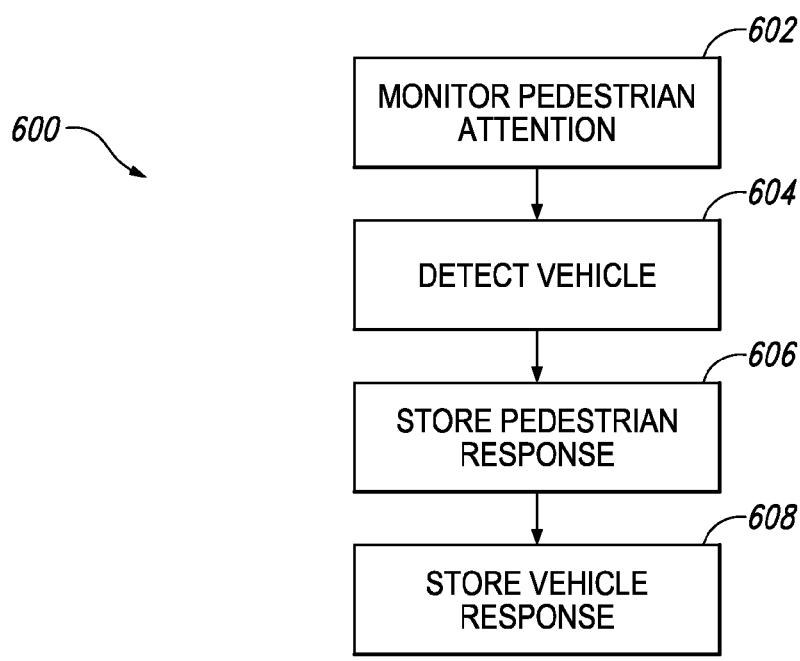
FIG. 4 is a flowchart illustrating another use of the applications shown in FIG. 1 and FIG. 2.

In some embodiments, step 506 may be omitted from the method illustrated in FIG. 3, and the device may be used simply to create a record of pedestrian (and optionally vehicle) behavior, as shown in FIG. 4. The device monitors 602 an attention level of the pedestrian and detects 604 a vehicle as described above. Optionally, it may issue an alert as described in connection with FIG. 3 (optional step not depicted in FIG. 4). It stores 606 a record of the behavior of the pedestrian around the vehicle in a memory (e.g., did the pedestrian look at the vehicle, did the pedestrian slow down or stop at an intersection, did the pedestrian pause in using the device as the vehicle approached). It may also store 608 a record of the behavior of the vehicle (e.g., did it stop, did it slow down, did it approach the pedestrian too closely). Such a record may be used, for example, to instruct the pedestrian about proper behavior in future encounters, or to provide a record in the event of a collision or near-miss between the vehicle and the pedestrian. In some embodiments, detection 604 of the vehicle may be omitted and instead (or additionally) the device may use a GPS or other device to identify the position of the pedestrian and record his behavior in the vicinity of expected traffic positions such as streets.

Various embodiments of pedestrian warning devices and methods have been described herein. In general, features that have been described in connection with one particular embodiment may be used in other embodiments, unless context dictates otherwise. For example, the eye position monitoring described in connection with FIG. 2 may be employed in the phones described in connection with FIG. 1, or with any of the embodiments described herein. For the sake of brevity, descriptions of such features have not been repeated, but will be understood to be included in the different aspects and embodiments described herein.

It will be understood that, in general, terms used herein, and especially in the appended claims, are generally intended as "open" terms (e.g., the term "including" should be interpreted as "including but not limited to," the term "having" should be interpreted as "having at least," the term "includes" should be interpreted as "includes but is not limited to," etc.). It will be further understood that if a specific number of an introduced claim recitation is intended, such an intent will be explicitly recited in the claim, and in the absence of such recitation no such intent is present. For example, as an aid to understanding, the following appended claims may contain usage of introductory phrases such as "at least one" or "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a transmitter" should typically be interpreted to mean "at least one transmitter"); the same holds true for the use of definite articles used to introduce claim recitations. In addition, even if a specific number of an introduced claim recitation is explicitly recited, it will be recognized that such recitation should typically be interpreted to mean at least the recited number (e.g., the bare recitation of "two alarms," or "a plurality of alarms," without other modifiers, typically means at least two alarms). Furthermore, in those instances where a phrase such as "at least one of A, B, and C," "at least one of A, B, or C," or "an [item] selected from the group consisting of A, B, and C," is used, in general such a construction is intended to be disjunctive (e.g., any of these phrases would include but not be limited to systems that have A alone, B alone, C alone, A and B together, A and C together, B and C together, or A, B, and C together, and may further include more than one of A, B, or C, such as $A_1$, $A_2$, and C together, A, $B_1$, $B_2$, $C_1$, and $C_2$ together, or $B_1$ and $B_2$ together). It will be further understood that virtually any disjunctive word or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A pedestrian warning device, comprising:
    a computing device configured to be worn or carried by a pedestrian and to monitor an attention level of the pedestrian; and
    an alarm configured to warn the pedestrian of a vehicle detected by the computing device, wherein the alarm is configured to warn the pedestrian in response to an alarm response history of the pedestrian.

2. The pedestrian warning device of claim 1, wherein the pedestrian warning device includes a camera configured to detect the vehicle.

3. The pedestrian warning device of claim 1, wherein the pedestrian warning device includes a microphone configured to detect the vehicle.

4. The pedestrian warning device of claim 1, wherein the alarm is configured to warn the pedestrian only if a predicted collision probability is determined to be above a threshold.

5. The pedestrian warning device of claim 1, wherein the alarm is configured to warn the pedestrian only if the attention level is determined to be below a threshold.

6. The pedestrian warning device of claim 1, wherein the alarm is configured to warn the pedestrian in response to the attention level of the pedestrian.

7. The pedestrian warning device of claim 1, wherein the alarm is configured to warn the pedestrian in a mode selected in response to the attention level of the pedestrian.

8. The pedestrian warning device of claim 1, wherein the alarm is configured to warn the pedestrian in a mode selected in response to an activity type of the pedestrian.

9. The pedestrian warning device of claim 8, wherein the activity type is selected from the group consisting of typing, talking, taking a picture, taking a video, having a video conference, playing a timed game, playing an untimed game, reading, watching a display, and using a display-based application.

10. The pedestrian warning device of claim 1, wherein the alarm is configured to warn the pedestrian in response to an attention history of the pedestrian.

11. The pedestrian warning device of claim 1, wherein the alarm is configured to warn the pedestrian in response to an eye position of the pedestrian.

12. The pedestrian warning device of claim 1, wherein the alarm is configured to warn the pedestrian in response to an eye position history of the pedestrian.

13. The pedestrian warning device of claim 1, wherein the alarm is configured to warn the pedestrian in response to a head orientation of the pedestrian.

14. The pedestrian warning device of claim 1, wherein the alarm is configured to warn the pedestrian in response to a head orientation history of the pedestrian.

15. The pedestrian warning device of claim 1, wherein the alarm is configured to warn the pedestrian in response to a position of the pedestrian.

16. The pedestrian warning device of claim 1, wherein the alarm is configured to warn the pedestrian in response to a motion of the pedestrian.

17. The pedestrian warning device of claim 1, wherein the alarm is configured to warn the pedestrian in response to a position of the computing device.

18. The pedestrian warning device of claim 1, wherein the alarm is configured to warn the pedestrian in response to an orientation of the computing device.

19. The pedestrian warning device of claim 1, wherein the computing device is a mobile telephone.

20. The pedestrian warning device of claim 1, wherein the computing device is a wearable device.

21. The pedestrian warning device of claim 1, further comprising a GPS configured to identify a location of the pedestrian.

22. The pedestrian warning device of claim 21, wherein the GPS is configured to identify whether the pedestrian is crossing a street at an intersection.

23. The pedestrian warning device of claim 21, wherein the pedestrian warning device is configured to monitor the gaze of the pedestrian, and the alarm is configured to warn the pedestrian in response to an attempt to cross a street without looking in a direction of oncoming traffic.

24. The pedestrian warning device of claim 21, wherein the pedestrian warning device is configured to monitor the head position of the pedestrian, and the alarm is configured to warn the pedestrian in response to an attempt to cross a street without looking in a direction of oncoming traffic.

25. The pedestrian warning device of claim 1, wherein the pedestrian warning device is configured to monitor the gaze of the pedestrian, and the alarm is configured to warn the pedestrian in response to an attempt to cross a street without looking in a direction of oncoming traffic.

26. The pedestrian warning device of claim 1, wherein the pedestrian warning device is configured to monitor the head position of the pedestrian, and the alarm is configured to warn the pedestrian in response to an attempt to cross a street without looking in a direction of oncoming traffic.

27. The pedestrian warning device of claim 1, further comprising a sensor configured to monitor a traffic signal.

28. The pedestrian warning device of claim 27, wherein the alarm is configured to warn the pedestrian in response to an attempt to cross a street in contravention of the traffic signal.

29. The pedestrian warning device of claim 1, wherein the alarm is audible.

30. The pedestrian warning device of claim 1, wherein the alarm is visible.

31. The pedestrian warning device of claim 1, wherein the alarm is haptic.

32. The pedestrian warning device of claim 1, further comprising a memory.

33. The pedestrian warning device of claim 32, wherein the memory is configured to store a record of the pedestrian's actions.

34. The pedestrian warning device of claim 32, wherein the memory is configured to store a record of vehicle detections.

35. The pedestrian warning device of claim 32, wherein the memory is configured to store a record of alarms issued.

36. A method of warning a pedestrian of a vehicle, comprising:
    monitoring an attention level of the pedestrian by monitoring an electronic device carried or worn by the pedestrian;
    detecting a vehicle; and
    in response to the detected vehicle, the monitored attention level, and an alarm response history of the pedestrian, alerting the pedestrian to the presence of the vehicle.

37. A method for monitoring the behavior of a pedestrian, comprising:
    monitoring an attention level of the pedestrian by monitoring an electronic device carried or worn by the pedestrian;
    monitoring a position of the pedestrian;
    monitoring a motion of the pedestrian; detecting a vehicle; and
    alerting the pedestrian if the pedestrian is determined to be in danger from a vehicle in response to the monitored attention level, the monitored position, and the monitored motion of the pedestrian and to an alarm response history of the pedestrian.

38. The method of claim 36, wherein alerting the pedestrian includes warning the pedestrian in response to the attention level of the pedestrian.

39. The method of claim 36, wherein alerting the pedestrian includes warning the pedestrian in response to an attention history of the pedestrian.

40. The method of claim 36, wherein alerting the pedestrian includes warning the pedestrian in response to a position of the pedestrian.

41. The method of claim 36, wherein alerting the pedestrian includes warning the pedestrian in response to a motion of the pedestrian.

42. The method of claim 36, wherein alerting the pedestrian includes alerting the pedestrian with a visual alarm.

43. The method of claim 36, wherein alerting the pedestrian includes alerting the pedestrian with an audible alarm.

44. The method of claim 36, wherein alerting the pedestrian includes alerting the pedestrian with a haptic alarm.

45. The method of claim 36, further comprising storing a record of the pedestrian's actions in a memory.

46. The method of claim 36, further comprising storing a record of vehicle detections in a memory.

47. The method of claim 36, further comprising storing a record of pedestrian alerts in a memory.

48. The method of claim 37, wherein monitoring the position of the pedestrian includes determining the proximity of the pedestrian to a street.

49. The method of claim 37, wherein monitoring a motion of the pedestrian includes determining that the pedestrian is moving toward a street.

50. The method of claim 37, wherein alerting the pedestrian includes warning the pedestrian in response to an attention level of the pedestrian.

51. The method of claim 37, wherein alerting the pedestrian includes warning the pedestrian in response to an attention history of the pedestrian.

52. The method of claim 37, wherein alerting the pedestrian includes alerting the pedestrian with a visual alarm.

53. The method of claim 37, wherein alerting the pedestrian includes alerting the pedestrian with an audible alarm.

54. The method of claim 37, wherein alerting the pedestrian includes alerting the pedestrian with a haptic alarm.

55. The method of claim 37, further comprising storing a record of vehicle detections in a memory.

56. The method of claim 37, further comprising storing a record of pedestrian alerts in a memory.

* * * * *